Dec. 16, 1941.　　　　E. A. DAVIS　　　　2,266,172
DIRECTION INDICATOR
Filed June 13, 1939　　　3 Sheets-Sheet 1
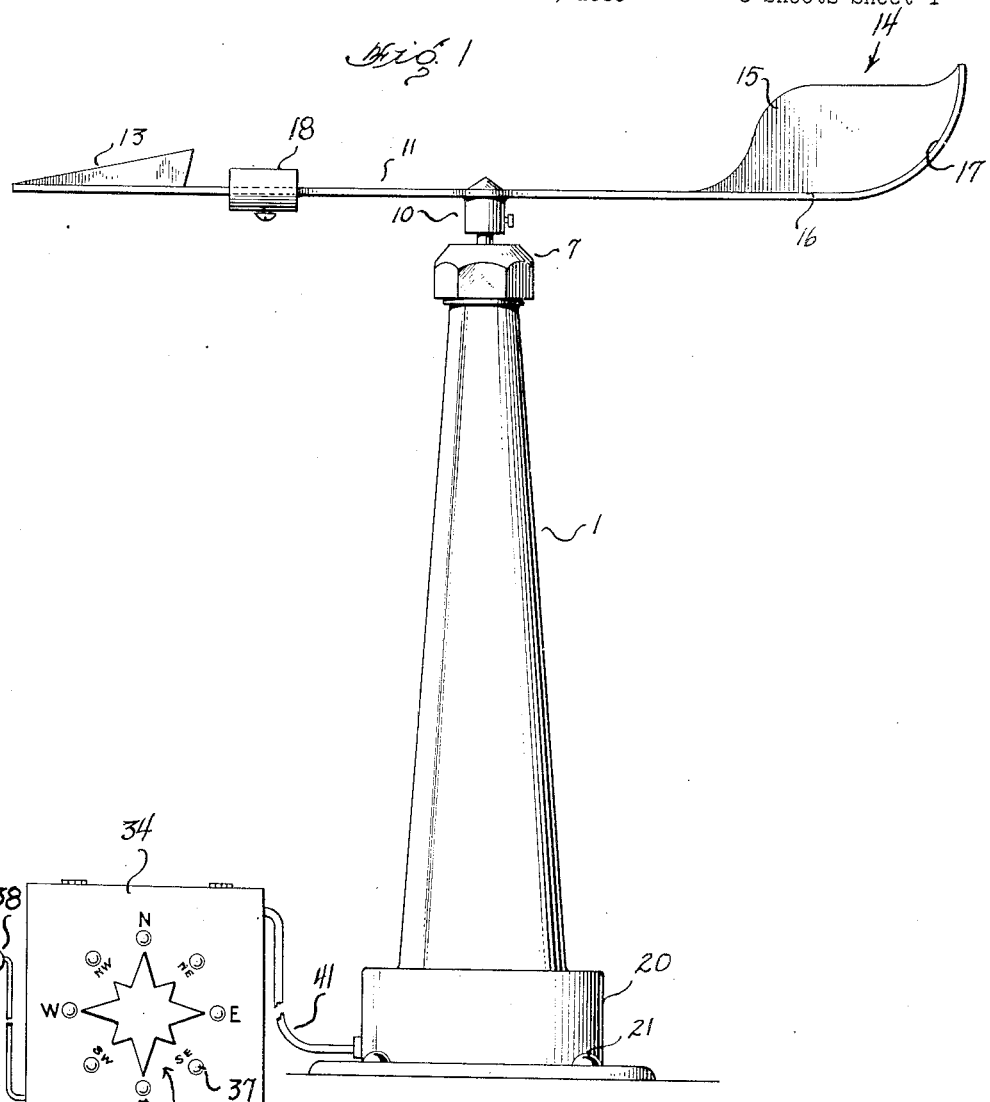
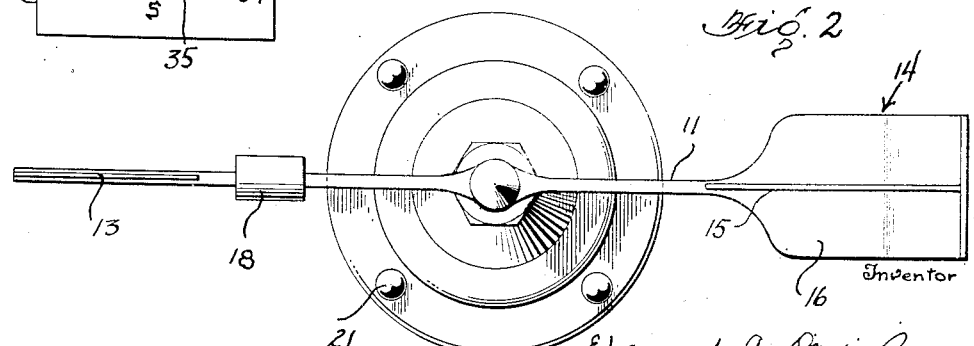

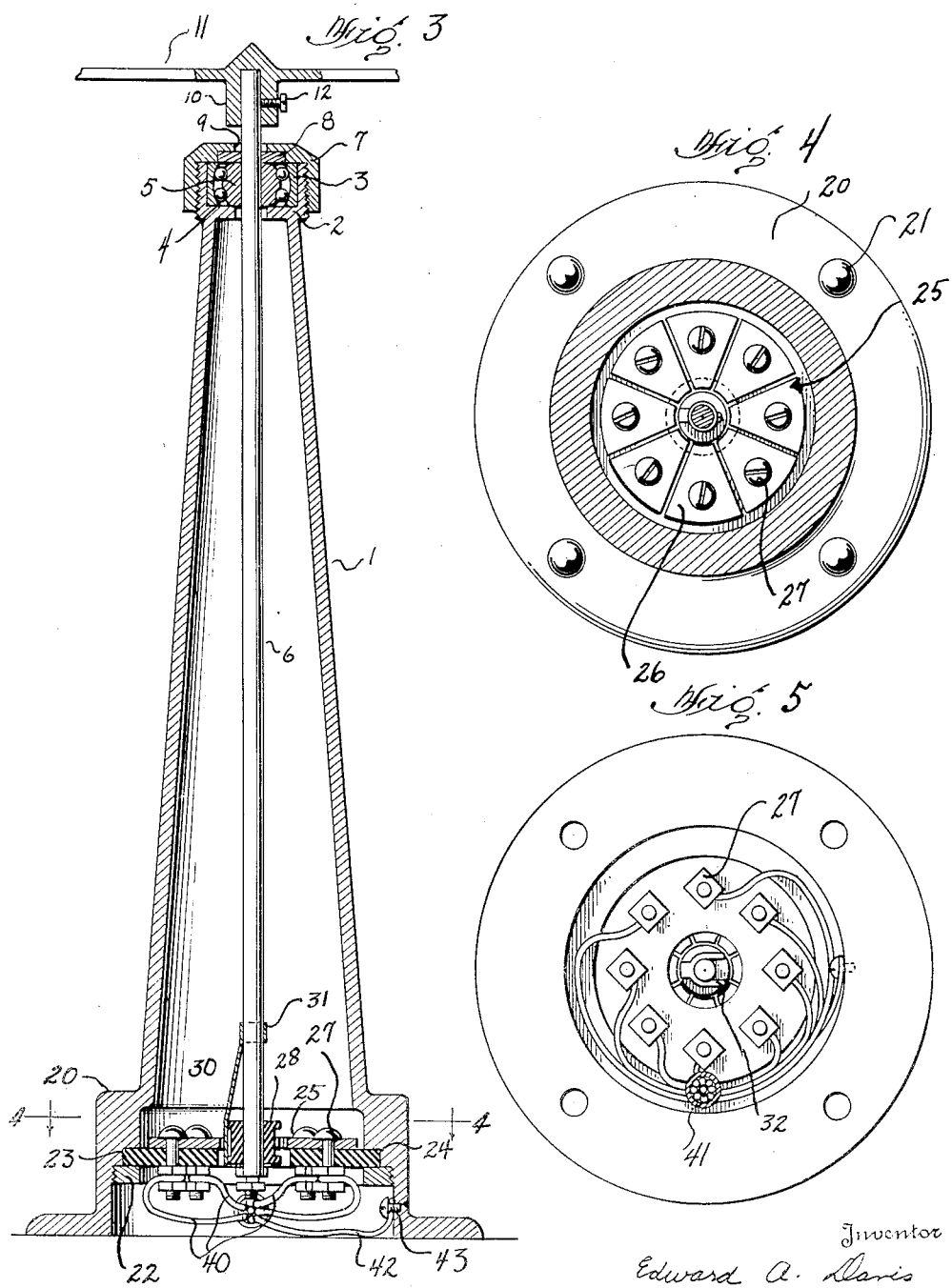

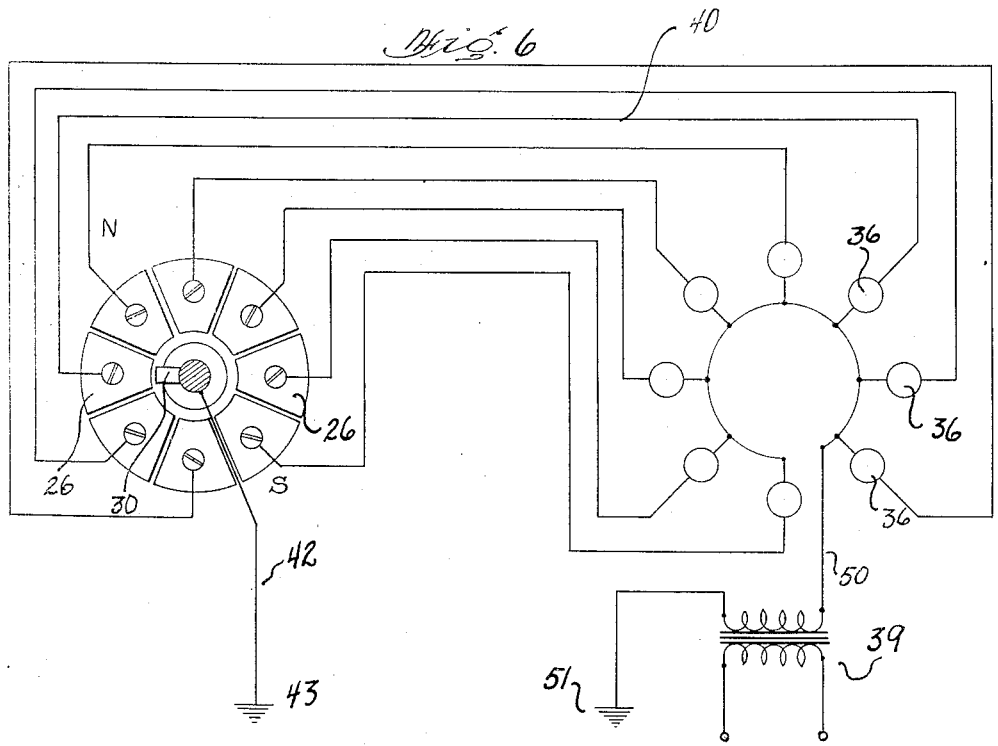
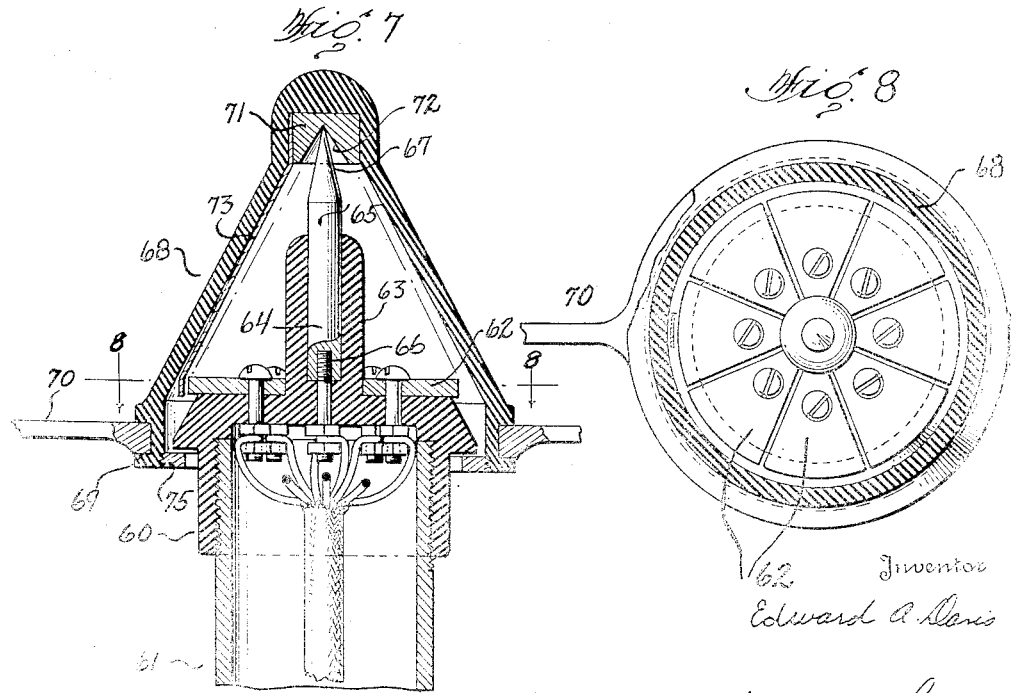

Patented Dec. 16, 1941

2,266,172

UNITED STATES PATENT OFFICE 2,266,172

DIRECTION INDICATOR

Edward A. Davis, Harwichport, Mass.

Application June 13, 1939, Serial No. 278,950

3 Claims. (Cl. 200—81)

The present invention relates to direction indicators and more particularly has reference to wind direction indicators provided with means whereby the direction of the wind can be indicated on a dial or the like located at a point remote from the weather vane.

I am, of course, aware that numerous electrically operated devices have heretofore been employed to indicate the direction of wind on a dial or other indicating member that was remotely located from the vane itself. The majority of these prior devices, however, have possessed certain disadvantageous features. With the majority of these indicators when the wind died, the signal lamps designating the last prevailing direction of the wind remained lighted. However, in some devices a switch was used to break the circuit to the signal lamps when the wind had died. It is believed apparent that with those hookups that did not employ a switch to break the circuit to the lamps when the wind had died, there would be an unnecessary consumption of electrical energy. Moreover, they did not indicate accurately the direction of wind, for if the wind had died, the signal lamps would continue to show that the wind was blowing from a certain direction.

An object of the present invention is to overcome the disadvantages now present in this art.

Another object of this invention is to provide an electrically operated device which will truly indicate the direction of the wind on a dial or the like located at a point remote from the weather vane.

Yet another object of the present invention is to provide an electrically operated device actuated by the weather vane for indicating visually on a dial remotely located from the vane the direction of the prevailing wind and extinguishing the indicating means when the wind has died.

And still another object of the present invention is to provide a weather vane with a novel circuit maker and breaker that will complete a circuit to signal lamps located remotely from the vane when the wind is blowing and automatically break the circuit when the wind has died.

A still further object of the present invention is to provide a weather vane assembly that is capable of both rotary movement and tilting movement.

To achieve the above and other important objects, my invention in general embraces the idea of mounting a weather vane on a vertical shaft in such a manner that the vane is capable of both rotary movement and tilting movement. An indicator box having a dial inscribed with the points of the compass is positioned at a convenient location. A signal lamp for each compass point is suitably mounted within the box. A circuit maker and breaker is associated with the vertical shaft so that when the wind is blowing at a certain speed the vane will be tilted, thus completing the circuit to the lamp located in the indicator box identifying that particular compass point. The circuit will remain closed as long as the wind continues to prevail. However, when the wind dies, a counter-weight mounted on the vane will move the vertical shaft back to its original or neutral position, thus breaking the circuit to the signal lamp.

In the drawings in which like numerals designate the same or similar parts:

Figure 1 is a view in side elevation illustrating my inventive concept.

Figure 2 is a top plan view of the device shown in Figure 1.

Figure 3 is a vertical longitudinal sectional view of the arrangement shown in Figure 1.

Figure 4 is a view taken along line 4—4 of Figure 3.

Figure 5 is a bottom plan view of Figure 3.

Figure 6 is a diagrammatic representation of the circuits to the signal lamps located in the indicator box.

Figure 7 is a fragmental sectional view of a modified form of my inventive concept.

Figure 8 is a view taken along line 8—8 of Figure 7.

I have shown in Figures 1 and 3 a hollow standard 1 of tapering configuration provided with a socket 2 at its upper end. Outer race 3 of a universal bearing 4 is mounted within the socket and inner race 5 carries a vertical spindle 6 that is disposed within the standard 1. A cap 7 is threaded onto the socket 2 to hold the bearing 4 in proper position. Packing 8 is disposed between the cap 7 and the bearing to prevent the entry of water or other foreign material into the bearing 4.

The upper end of the spindle 6 extends through an aperture 9 formed in the cap 7 and hub 10 of a horizontal arm 11 is attached thereto by a set screw 12. As best shown in Figure 1, the arm 11 is provided at one extremity with an arrow 13 and at its opposite extremity with a vane 14. The vane 14 comprises a vertical member 15 and a deflector 16 that curves rearwardly and upwardly as shown at 17. It can be clearly seen from Figures 1 and 2 that the deflector 16 is perpendicular to the member 15 and will, therefore, always be perpendicular to the direction of the wind. As will later be more fully discussed, the deflector 16 will enable the arm 11 to be rocked on the bearing 4 when the wind is blowing. A counter-weight 18 is slidably mounted on the arm 11 between the arrow 13 and the hub 10. The counter-weight is employed to ballance the arrow 13 with respect to the vane 14.

In Figure 3 it will be noted that the standard 1 is formed with an enlarged hollow base 20 that can be attached to any suitable support such as the roof of a house by bolts or the like 21. A metal retaining ring 22 is screwed within the base 20 and an insulator block 23 is positioned on the upper face of the ring 22 and fits within a shouldered recess 24. A distributor assembly 25 is disposed on the block 23. In Figure 4 it will be seen that the distributor assembly comprises a plurality of metallic segments 26. There is to be one segment for each point of the compass that is to be indicated and since I have illustrated my inventive concept employed in conjunction with eight compass points, the distributor is composed of eight segments.

Binding posts 27 secure the segments to the insulating block 23.

The lower extremity of the spindle 6 extends through the segments 26 and the block 23 and an insulator 28 is attached to the end of the spindle to prevent it from making contact with the segments. A metallic contact 30 is secured at its upper end as shown at 31 to the spindle and the lower end thereof is bifurcated as shown at 32 so that it can fit around the end of the spindle beneath the insulator 28. As perhaps best shown in Figure 6, the contact 30 is of such width that it can make contact with more than one segment.

As shown in Figure 1, an indicator box 34 that is adapted to be located at some point remote from the standard 1 is provided. The front face of the box carries a dial 35 inscribed with the points of the compass, and I have shown eight such compass points. Signal lamps 36 are mounted within the box so that when they are lighted, light will be reflected through glass reflectors 37 associated with each compass point for visually indicating the direction in which the wind is blowing. Electrical energy is supplied by plugging connection 38 into a convenient outlet, and transformer 39 disposed within the box 34 will permit a stepdown from the house current. In use I have found that six volts permit my invention to operate safely and economically.

Referring again to Figure 3, it can be seen that a conductor 40 is attached to the binding post of each segment and each of the conductors is carried by a cable 41 that extends from the base of the standard 1 to the indicator box 34. Conductor 42 is grounded to the base 2 as shown at 43.

The operation of my invention may be briefly described as follows. Let us assume that the counter-weight 18 is positioned on the arm 11 to permit the operation of my vane when the wind his attained a velocity of ten miles per hour. When the wind reaches this velocity, it will strike the deflector 16, thus rocking the arm 11 and at the same time tilting the arm about the bearing 4. This movement of the arm 11 is, of course, imparted to the spindle 6 and if the wind is blowing from the west, for example, the contact 30 will be moved into engagement with segment 26 that designates west. As can be seen in Figure 6, the circuit is from ground 43, conductor 42, contact 30, segment 26, conductor 40, lamp 36, lamp 50, transformer 39, and ground 51. The light 36 will remain lighted so long as the wind continues to blow from the west. However, if the wind should completely die, or go below a velocity of ten miles an hour, the counter-weight 18 will rock the arm 11 back to a substantially horizontal position which will in turn move spindle 6 to its vertical or neutral position, thereby moving contact 30 from engagement with the segment 26.

Manifestly, by the use of my invention, the indicator lights in the box 34 will remain lighted only as long as the wind is prevailing. By providing a circuit maker and breaker that will extinguish the signal lamps upon the failure of the wind, or the lessening of the velocity of the wind beneath a predetermined velocity, not only is much more economical than those devices heretofore employed, but it is much more accurate. Furthermore, my direction indicator consists of relatively few essential working parts, and these parts can be readily replaced or repaired.

In Figures 7 and 8, I have shown a somewhat modified form of my wind direction indicator. In this embodiment, it can be seen that a cap 60 of insulating material is threaded onto the upper open end of a hollow standard 61. The cap 60 is adapted to receive on its upper face a plurality of metallic segments 62 which correspond to the segments 26 described in connection with Figures 1 to 6 inclusive. The cap 60 is provided with a centrally disposed vertical member 63 that is preferably integrally formed with the cap. The member 63 has a bore 64 and a pivot pin 65 is disposed within the bore. A screw 66 secures the pin within the bore and the upper end of the support is tapered to a point as shown at 67.

A conical cap 68 also formed of insulating material has suitably secured at its lower portion, as indicated at 69, horizontal arm 70. The arm 70 is similar in construction and operation to the arm 11 illustrated in Figure 1. A metal block 71 is suitably mounted within the cap 68 and is provided with a conical socket 72, and it will be noted that the angle of the socket is greater than that of the pivot pin 65. As clearly shown in Figure 7, a metal contact strip 73 is interposed between the block 71 and the inner wall of the cap 68 and is bent slightly at its lower end so that it can make contact with one or more of the segments 62.

The cap 68 is adapted to be positioned over the upper end of the standard 61 so that the point 67 of the pin 65 will be received within the socket 72 to form an anti-friction pivotal bearing for the cap 68. Manifestly, this will permit both rotary and oscillatory movement to be transmitted to the arm 70. When the cap 68 is properly located with respect to the standard 61, a metallic retaining ring 75 is threaded into the lower inner portion of the cap 61, and this ring will, of course, prevent the cap 68 from completely coming off of the top of the standard.

I believe that the operation of this form of my invention is readily apparent. However, when the velocity of the wind rocks the arm 70, the cap 68 will be tilted about the pin 65, thereby moving the contact strip 73 into engagement with the segment 62 corresponding to that particular direction. This will cause a circuit to be completed to a signal lamp located remotely with respect to the standard in the same manner previously described in connection with Figures 1 to 6 inclusive. Of course, when the wind dies, or goes below a predetermined velocity, the arm 70 will then be moved to a substantially horizontal position, thus moving contact 73 from engagement with the segment 62. Thus the circuit to the signal lamp is open and the lamp will be extinguished.

From the foregoing description, it is believed readily apparent that I have provided a weather vane assembly for indicating visually at a point remote from the vane itself the direction in which the wind is blowing. This indicator is highly accurate and will indicate visually the direction of the wind only so long as the wind continues to blow. Furthermore, my device can be easily and cheaply manufactured and consists of relatively few essential working parts.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A wind operated circuit controller selective contact indicator comprising an upright standard, a device mounted on said standard, said device being capable of both a rotative and rocking movement, a vane mounted on said device to enable the wind to cause the rotation, a contact strip secured to the said rotatable device, and a plurality of spaced contacts fixedly mounted on the said standard, said strip being brought into engagement with the said spaced contacts when the said device is rocked by the pressure of the wind.

2. A wind operated circuit controller selective contact indicator comprising an upright standard, said standard being provided with a longitudinally extending channel, a shaft mounted in the standard and extending the length of the channel, said shaft being capable of both a rotative and rocking movement, a vane mounted on the upper extremity of said shaft to enable the wind to cause the rotation, a contact device mounted on the lower extremity of said shaft, and a plurality of spaced contacts mounted in the channel at the lower extremity of the channel, said contact device being brought into engagement with the said spaced contacts when the shaft is rocked by the pressure of the wind.

3. A wind operated circuit controller selective contact indicator comprising an upright standard, a plurality of spaced contacts mounted on the upper extremity of said standard, a pivot pin supported by the upper extremities of said standard, a cap supported by said pin, said cap being capable of both a rotative and rocking movement, a vane mounted on the cap to enable the wind to cause the rotation, and a contact device secured to the interior of said cap, said contact device being brought into engagement with the said spaced contacts when the cap is rocked by the pressure of the wind.

EDWARD A. DAVIS.